US010711672B2

(12) United States Patent
Ulrey et al.

(10) Patent No.: US 10,711,672 B2
(45) Date of Patent: *Jul. 14, 2020

(54) METHOD AND SYSTEM FOR CATALYST TEMPERATURE CONTROL

(71) Applicant: Ford Global Technologies, LLC, Dearborn, MI (US)

(72) Inventors: Joseph Norman Ulrey, Dearborn, MI (US); William Charles Ruona, Farmington Hills, MI (US); Thomas G. Leone, Ypsilanti, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 794 days.

This patent is subject to a terminal disclaimer.

(21) Appl. No.: 15/407,787

(22) Filed: Jan. 17, 2017

(65) Prior Publication Data

US 2017/0122164 A1 May 4, 2017

Related U.S. Application Data

(63) Continuation of application No. 13/743,247, filed on Jan. 16, 2013, now Pat. No. 9,556,771.

(51) Int. Cl.
*F01N 3/10* (2006.01)
*F01N 3/20* (2006.01)
(Continued)

(52) U.S. Cl.
CPC ............. *F01N 3/2006* (2013.01); *F01N 3/10* (2013.01); *F02D 9/04* (2013.01); *F02D 37/02* (2013.01);
(Continued)

(58) Field of Classification Search
CPC ...... F01N 5/02; F01N 2240/36; F01N 11/002; F01N 3/10; F01N 13/009; F01N 2240/02;
(Continued)

(56) References Cited

U.S. PATENT DOCUMENTS 6,343,594 B1   2/2002   Koeslin et al.
7,617,678 B2   11/2009  Joergl et al.
(Continued)

FOREIGN PATENT DOCUMENTS

DE   19959485 A1   6/2001
EP   1662123 A2    5/2006
(Continued)

*Primary Examiner* — Patrick Hamo
*Assistant Examiner* — Paul W Thiede
(74) *Attorney, Agent, or Firm* — Geoffrey Brumbaugh; McCoy Russell LLP

(57) ABSTRACT

Methods and systems are provided for controlling and coordinating control of a post-catalyst exhaust throttle and an EGR valve to expedite catalyst heating. By closing both valves during an engine cold start, an elevated exhaust backpressure and increased heat rejection at an EGR cooler can be synergistically used to warm each of an engine and an exhaust catalyst. The valves may also be controlled to vary an amount of exhaust flowing through an exhaust venturi so as to meet engine vacuum needs while providing a desired amount of engine EGR.

19 Claims, 5 Drawing Sheets

(51) Int. Cl.
| | |
|---|---|
| *F02D 41/02* | (2006.01) |
| *F02P 5/15* | (2006.01) |
| *F02D 41/00* | (2006.01) |
| *F02D 9/04* | (2006.01) |
| *F02D 37/02* | (2006.01) |
| *F02M 26/10* | (2016.01) |
| *F02M 26/15* | (2016.01) |
| *F02M 26/25* | (2016.01) |
| *F02M 26/36* | (2016.01) |
| *F02M 26/44* | (2016.01) |
| *F02M 26/07* | (2016.01) |
| *F02M 26/05* | (2016.01) |
| *F02M 26/06* | (2016.01) |
| *F02M 26/24* | (2016.01) |
| *F02M 26/47* | (2016.01) |

(52) U.S. Cl.
CPC ..... *F02D 41/0055* (2013.01); *F02D 41/0255* (2013.01); *F02M 26/07* (2016.02); *F02M 26/10* (2016.02); *F02M 26/15* (2016.02); *F02M 26/25* (2016.02); *F02M 26/36* (2016.02); *F02M 26/44* (2016.02); *F02P 5/1502* (2013.01); *F02D 2250/41* (2013.01); *F02M 26/05* (2016.02); *F02M 26/06* (2016.02); *F02M 26/24* (2016.02); *F02M 26/47* (2016.02); *Y02T 10/26* (2013.01); *Y02T 10/46* (2013.01); *Y02T 10/47* (2013.01)

(58) Field of Classification Search
CPC ............ F01N 2260/14; F01N 2410/06; F01N 2550/02; F01N 3/02; F01N 3/2006; F01N 11/005; F01N 13/008; F01N 13/08; F01N 1/00; F01N 1/18; F01N 2240/10; F01N 2240/20; F01N 2340/02; F01N 2410/00; F01N 2470/30; F01N 2560/06; F01N 2560/08; F01N 2900/0422; F01N 2900/0601; F01N 2900/08; F01N 2900/1402; F01N 2900/1404; F01N 2900/1406; F01N 2900/1602; F01N 2900/1626; F01N 3/0205; F01N 3/021; F01N 3/0235; F01N 3/20; F01N 3/2066; F01N 9/00; F01N 9/005; Y02T 10/47; Y02T 10/16; Y02T 10/26; Y02T 10/121; Y02T 10/14; Y02T 10/144; Y02T 10/166; Y02T 10/20; Y02T 10/146; Y02T 10/46; F02M 26/06; F02M 26/15; F02M 26/05; F02M 26/10; F02M 26/28; F02M 26/07; F02M 26/24; F02M 26/47; F02M 2026/001; F02M 26/22; F02M 26/27; F02M 26/30; F02M 26/33; F02M 26/35; F02M 26/44; F02M 2026/004; F02M 26/04; F02M 26/14; F02M 26/16; F02M 26/25; F02M 26/32; F02M 26/50; F02M 35/104; F02M 26/36; F02D 41/064; F02D 9/04; F02D 41/0065; F02D 41/0077; F02D 21/08; F02D 2200/0802; F02D 41/0055; F02D 41/068; F02D 2200/021; F02D 2700/04; F02D 41/0007; F02D 41/0052; F02D 41/0255; F02D 41/26; F02D 2013/0292; F02D 2041/1472; F02D 2250/34; F02D 41/005; F02D 41/0082; F02D 41/0245; F02D 41/1408; F02D 41/1446; F02D 41/1448; F02D 14/1458; F02D 41/3035; F02D 2250/41; F02D 37/02; F01P 2060/08; F01P 3/20; F01P 2037/02; F01P 2060/16; F02N 2200/0804; F02N 19/10; B60H 1/20; B60H 1/025; B60H 1/04; F02P 5/15; F02P 5/1502; B60T 17/02; F02B 29/0468; F02B 37/00; F02B 37/18; F02B 37/22; F02G 5/02; F02G 5/04
USPC ..................... 60/605.2; 123/568.21; 701/108
See application file for complete search history.

(56) References Cited

U.S. PATENT DOCUMENTS

| | | | |
|---|---|---|---|
| 7,833,301 B2 | 11/2010 | Schindler et al. | |
| 8,176,894 B2 | 5/2012 | Ulrey et al. | |
| 8,839,607 B2 | 9/2014 | Pursifull et al. | |
| 9,429,110 B2 | 8/2016 | Ulrey et al. | |
| 2003/0014966 A1 | 1/2003 | Hirota et al. | |
| 2006/0179824 A1 | 8/2006 | Roser | |
| 2007/0125070 A1* | 6/2007 | Storhok | F01N 3/0842 60/285 |
| 2009/0013969 A1 | 1/2009 | Winstead | |
| 2009/0094978 A1 | 4/2009 | Yamagata et al. | |
| 2010/0005784 A1 | 1/2010 | Bird et al. | |
| 2010/0126142 A1 | 5/2010 | Murata et al. | |
| 2011/0072801 A1 | 3/2011 | Lupescu et al. | |
| 2011/0132337 A1* | 6/2011 | Lupescu | F01N 3/0835 123/568.21 |
| 2012/0031381 A1 | 2/2012 | Styles et al. | |
| 2012/0124980 A1 | 5/2012 | Prenger et al. | |
| 2012/0197550 A1 | 8/2012 | Cianflone et al. | |
| 2012/0240557 A1 | 9/2012 | Kawaguchi et al. | |
| 2013/0195628 A1 | 8/2013 | Keefover | |
| 2014/0069086 A1 | 3/2014 | LaPointe et al. | |
| 2014/0165536 A1 | 6/2014 | Pursifull et al. | |
| 2014/0165560 A1 | 6/2014 | Henry et al. | |
| 2014/0196699 A1 | 7/2014 | Ulrey et al. | |
| 2015/0121847 A1 | 5/2015 | Pursifull | |
| 2015/0121848 A1 | 5/2015 | Pursifull | |

FOREIGN PATENT DOCUMENTS

| | | |
|---|---|---|
| EP | 1906000 A2 | 4/2008 |
| JP | 2768734 B2 | 6/1998 |
| JP | 2897426 B2 | 5/1999 |
| JP | 2002081311 A | 3/2002 |
| JP | 2003232213 A | 8/2003 |
| JP | 2004076683 A | 3/2004 |
| JP | 2004225539 A | 8/2004 |
| JP | 2009008022 A | 1/2009 |
| JP | 2009097404 A | 5/2009 |
| JP | 2009114991 A | 5/2009 |
| JP | 2012036829 A | 2/2012 |
| WO | 2008013585 A2 | 1/2008 |
| WO | 2009099399 A1 | 8/2009 |

* cited by examiner

METHOD AND SYSTEM FOR CATALYST TEMPERATURE CONTROL

CROSS-REFERENCE TO RELATED APPLICATION

The present application is a continuation of U.S. patent application Ser. No. 13/743,247 entitled "METHOD AND SYSTEM FOR CATALYST TEMPERATURE CONTROL," filed on Jan. 16, 2013, the entire contents of which are incorporated herein by reference for all purposes.

FIELD

The present description relates to systems and methods for expediting heating of an exhaust catalyst, in particular, during an engine cold start.

BACKGROUND AND SUMMARY

Engine cold-start emissions released before an exhaust catalyst has been sufficiently warmed may lower vehicle exhaust quality. Accordingly, engine control systems may use various approaches to expedite attainment of an activation temperature (e.g., a light-off temperature) at the exhaust catalyst.

One example approach described in U.S. 2010/0005784 involves increasing exhaust gas temperatures. Therein, an exhaust backpressure valve (or exhaust throttle) is closed to increase an exhaust temperature and enable desulfination of an exhaust catalyst. However, the inventors herein have recognized potential issues with such an approach. Increasing exhaust back-pressure by closing the exhaust backpressure valve may increase the dilution of the cylinder charge with burned gases, resulting in unstable combustion under some conditions. Further, the diluted cylinder charge may limit the amount of spark retard that can be applied, thus limiting the temperature increase of the exhaust.

Another example approach is shown by Joergl et al in U.S. Pat. No. 7,617,678. Therein, the engine's air intake system includes a valve assembly having a valve and a housing with an inlet in fluid communication with an EGR cooler, an inlet in fluid communication with a charge air cooler, and an outlet in fluid communication with the engine. A position of the valve in the housing is adjusted with respect to the inlet and outlets so that an amount of exhaust gas recirculation can be adjusted during an engine cold-start, thereby elevating an exhaust temperature. At the same time, the need for a distinct EGR valve and an exhaust gas backpressure valve is reduced.

However, the inventors herein have realized that by independently controlling each of an exhaust gas backpressure valve (or throttle) and an EGR valve, synergistic benefits can be achieved that can expedite exhaust catalyst activation. Further, the synergistic benefits may outweigh the component reduction benefits. Further still, it may be more effective to transfer heat from exhaust before a pressure drop at exhaust valve opening (EVO) creates a corresponding temperature drop. In one example, this may be achieved by a method for expediting activation of an exhaust catalyst coupled to an engine comprising: during an engine cold-start, closing a post-catalyst exhaust throttle while diverting at least a portion of the throttled exhaust gas through an EGR cooler coupled upstream of the throttle. In this way, increased exhaust throttling and increased heat rejection from an EGR cooler may be synergized to rapidly activate an exhaust catalyst while also heating an engine.

As an example, during an engine cold start, while an engine temperature is below a threshold temperature, an exhaust throttle coupled downstream of an exhaust catalyst may be closed (or moved to a more closed position). By throttling the exhaust, heat transfer to the engine and exhaust catalyst can be improved. This can be attributed to two effects. First, the higher density of the (slower moving) exhaust gas due to the higher pressure improves heat transfer (per kilogram) of the exhaust flow. Further, the expansion to atmosphere post-catalyst drops the temperature below ambient temperature. In other words, a heat pump effect is achieved. This effect enables almost all the exhaust heat to be recovered without requiring the addition of a heat exchanger. By using a post-catalyst throttle, the time and temperature that a given mass of exhaust gas is in contact with engine parts is substantially increased, expediting catalyst activation. As such, the exhaust throttle may be intermittently opened in response to elevated exhaust backpressure to provide pressure relief. Further, an intake airflow may be controlled along with the exhaust throttle to limit engine output torque. An EGR valve positioned in an EGR passage coupled to the engine exhaust upstream of the exhaust backpressure valve (and downstream of the exhaust catalyst) may also be maintained closed during the cold-start. This enables the throttled exhaust to be directed through an EGR cooler of the EGR passage, thereby increasing an EGR outlet temperature. Since the heat exchanger of the EGR cooler is in communication with the engine coolant, by raising the EGR cooler outlet temperature, an amount heat rejected by the EGR cooler is increased, and an engine temperature can be rapidly raised. That is, the EGR cooler may be utilized to recover heat at high pressure. As such, this provides a more effective way of recovering latent heat from the water in the exhaust. In still further embodiments, intake and/or exhaust valve timings may be adjusted to reduce internal exhaust gas recirculation and increase combustion stability.

In this way, increased exhaust backpressure and increased heat rejection from an EGR cooler can be advantageously used to warm up an engine and an exhaust catalyst faster. The combination acts synergistically, enabling exhaust catalyst activation and engine warm-up to be expedited without compromising combustion stability, thus avoiding potential misfires. By rapidly heating the exhaust catalyst, cold-start exhaust emissions can be reduced. Additionally, by maintaining relatively low dilution even with the exhaust backpressure valve closed, spark timing adjustments (e.g., spark retard) can be used to further increase the exhaust gas temperature.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
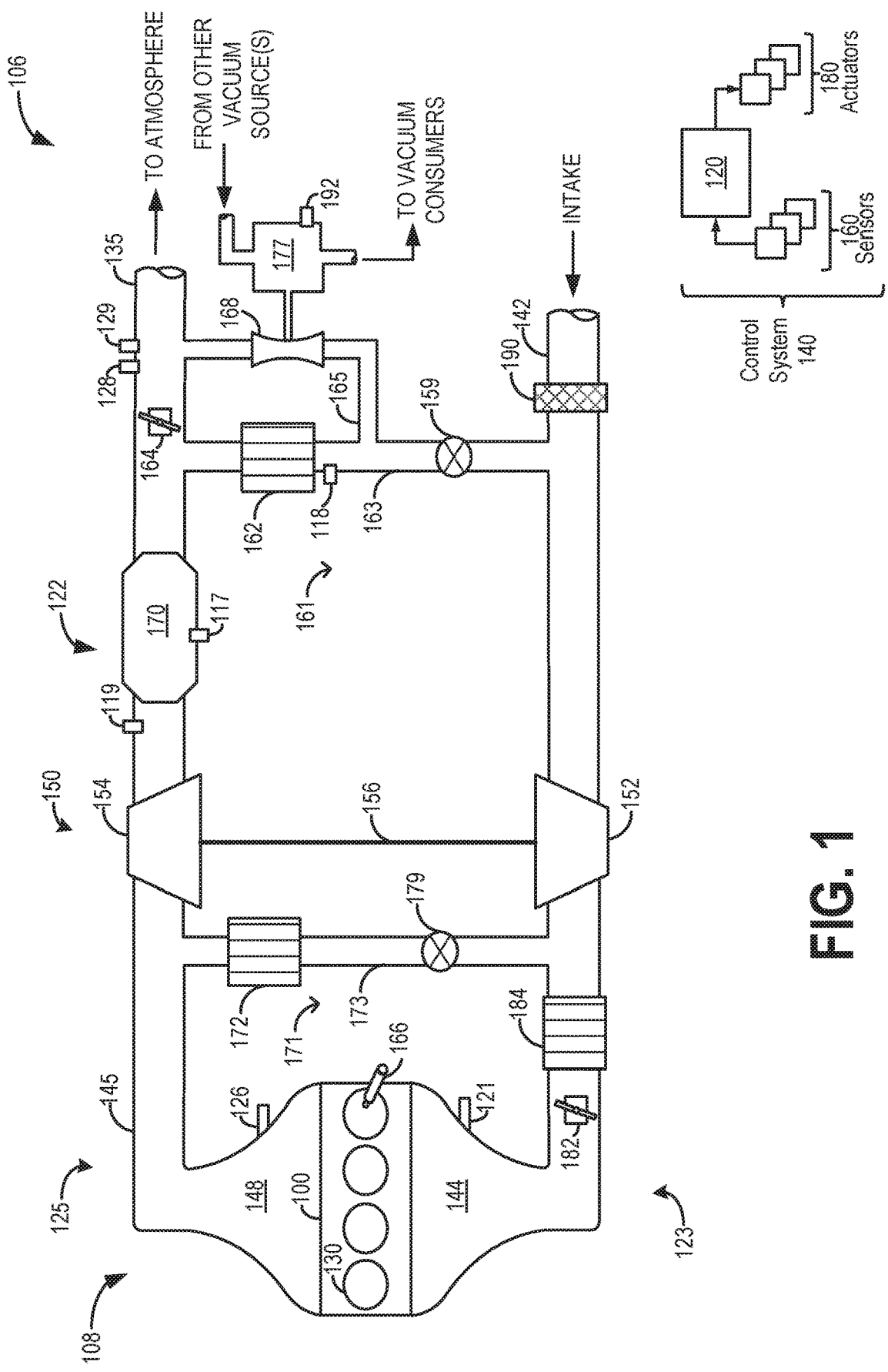
FIG. 1 shows a schematic depiction of an engine system.

Methods and systems are provided for expediting engine warm-up and catalyst activation in a vehicle engine, such as the engine system of FIG. 1. During an engine cold-start, synergistic benefits of increased exhaust backpressure and increased heat rejection at an EGR cooler may be advantageously used to quickly raise an engine temperature. A controller may be configured to perform a control routine, such as the example routine of FIG. 2, to throttle an exhaust valve positioned downstream of an exhaust catalyst to raise an exhaust backpressure while also closing an EGR valve to flow at least a portion of the throttled exhaust gas through an EGR cooler. The increased backpressure enables a rapid increase in engine temperature by trapping hot exhaust gas in engine cylinders, while flow of throttled exhaust gas through an EGR cooler enables a further increase in engine temperature via heat rejection at the EGR cooler. The synergistic combination enables faster activation of an exhaust catalyst, while also addressing engine cold-start NVH issues. The controller may also be configured to perform a control routine, such as the example routine of FIG. 4, to operate and transition the engine system between various operating modes based on an engine heating needs, EGR needs, and vacuum needs. By adjusting one or more of the EGR valve and the exhaust throttle, EGR may be provided while heating an exhaust catalyst and drawing vacuum at an exhaust ejector. Example valve and throttle adjustments are described at FIGS. 3 and 5.

FIG. 1 shows a schematic depiction of a vehicle system 106. The vehicle system 106 includes an engine system 108, including engine 100 coupled to emission control system 122. Engine 100 includes a plurality of cylinders 130. Engine 100 also includes an intake 123 and an exhaust 125. Intake 123 may receive fresh air from the atmosphere through intake passage 142. Air entering intake passage 142 may be filtered by air filter 190. Intake passage 142 may include an air intake throttle 182 positioned downstream of an intake compressor 152 and an intake charge air cooler 184. Intake throttle 182 may be configured to adjust the flow of intake gas (e.g., boosted intake air) entering engine intake manifold 144. Exhaust 125 includes an exhaust manifold 148 leading to an exhaust passage 145 that routes exhaust gas to the atmosphere via tailpipe 135.

Engine 100 may be a boosted engine including a boosting device, such as turbocharger 150. Turbocharger 150 may include intake compressor 152, arranged along intake passage 142, and an exhaust turbine 154, arranged along exhaust passage 145. Compressor 152 may be at least partially driven by turbine 154 via shaft 156. The amount of boost provided by the turbocharger may be varied by an engine controller. In some embodiments, a bypass passage controlled via a wastegate (not shown) may be coupled across the exhaust turbine so that some or all of the exhaust gases flowing through exhaust passage 145 can bypass turbine 154. By adjusting the position of the wastegate, an amount of exhaust gas delivered through the turbine may be varied, thereby varying an amount of boost delivered to the engine intake.

In further embodiments, a similar bypass passage controlled via a bypass valve (not shown) may be coupled across the intake compressor so that some or all of the intake air compressed by compressor 152 can be recirculated into the intake passage 142 upstream of compressor 152. By adjusting the position of the compressor bypass valve, pressure in the intake system may be released during selected conditions to reduce the effects of compressor surge loading.

An optional charge air cooler 184 may be included downstream of compressor 152 in the intake passage to reduce the temperature of intake air compressed by the turbocharger. Specifically, after-cooler 184 may be included upstream of intake throttle 182 or integrated into the intake manifold 144.

Emission control system 122, coupled to exhaust passage 145, includes a catalyst 170. Catalyst 170 may include multiple catalyst bricks, in one example. In another example, multiple emission control devices, each with multiple bricks, can be used. Catalyst 170 can be a three-way type catalyst in one example. In other examples, catalyst 170 may be an oxidation catalyst, lean NOx trap, selective catalyst reduction (SCR) device, particulate filter, or other exhaust treatment device. While catalyst 170 is arranged downstream of turbine 154 in the embodiments described herein, in other embodiments, catalyst 170 may be arranged upstream of a turbocharger turbine or at another location in the engine exhaust passage without departing from the scope of this disclosure.

An exhaust throttle or backpressure valve 164 may be located in the exhaust passage, downstream of exhaust catalyst 170. In the embodiments described herein, controller 120 may control a position of exhaust throttle 164 based on various engine operating conditions and parameter values (e.g., engine cold start, stored vacuum level, shutdown, etc.). In other embodiments, the exhaust throttle, exhaust passage, and other components may be designed such that the exhaust throttle is mechanically controlled as needed during various engine operating conditions, without control system intervention. As elaborated with reference to FIG. 2, exhaust throttle 164 may be selectively closed by controller 120 during engine cold-start conditions to rapidly raise an exhaust pressure and temperature. By throttling the exhaust valve, a larger amount of hot exhaust gas can be trapped in an engine cylinder, further raising an exhaust temperature and expediting activation of a downstream exhaust catalyst.

As such, the improvement in heat transfer to the engine and exhaust catalyst via throttling of the exhaust can be attributed to at least two effects. First, the higher density of the (slower moving) exhaust gas, due to the higher pressure of the exhaust gas, improves heat transfer per kilogram of the exhaust flow. Further, the expansion to atmosphere post-catalyst (e.g., post an exhaust three-way catalyst) drops the temperature below ambient temperature, creating a heat pump effect. Consequently, substantially all the exhaust heat can be recovered without requiring the addition of a heat exchanger. In particular, by using a post-catalyst throttle, the time and temperature that a given mass of exhaust gas is in contact with engine parts is substantially increased. This expedites the catalyst activation. It will be appreciated that while the depicted embodiment achieves post catalyst expansion of the exhaust via an exhaust throttle, in alternate embodiments, the same may be achieved via a post-catalyst orifice in the engine exhaust passage 145.

Exhaust throttle 164 may be maintained in a fully open position (or wide open throttle) during most engine operating conditions, but may be configured to close to increase exhaust backpressure under certain conditions, as will be detailed below. In one embodiment, exhaust throttle 164 may have two restriction levels, fully open or fully closed. However, in an alternate embodiment, the position of exhaust throttle 164 may be variably adjustable to a plurality of restriction levels by controller 120.

As detailed herein, adjustments of exhaust throttle position may affect air flow through the engine. For example, a fully closed throttle may be conceptualized as a "potato in the tailpipe" which restricts exhaust flow, thereby causing an increase in exhaust backpressure upstream of the closed throttle. This increase in exhaust backpressure leads to a direct increase in exhaust temperature which may be advantageously used during selected conditions (e.g., during an engine cold-start) to expedite warming of exhaust catalyst 170. In some embodiments, while closing the exhaust throttle, spark timing may be retarded to further elevate exhaust temperatures, thereby further expediting catalyst activation.

To compensate for the effects of exhaust throttle adjustment on engine air flow, one or more other engine components may be adjusted. As an example, as the throttle closes, mass air flow may initially decrease, and thus an intake throttle (such as intake throttle 182) may be opened to admit more air to the engine to maintain engine speed and reduce torque fluctuation. In this way, while the throttle is used to manage backpressure, airflow may be controlled to limit an engine output torque. As another example, spark timing may be adjusted (e.g., advanced) while the throttle is closed to improve combustion stability. In some embodiments, valve timing adjustments may also be used (e.g., adjustments to an amount of valve overlap) in conjunction with throttle position adjustments to improve combustion stability. For example, intake and/or exhaust valve timings may be adjusted to adjust internal exhaust gas recirculation and increase combustion stability.

Vehicle system 106 further includes a low-pressure EGR (LP-EGR) system 161. LP-EGR system 161 includes an EGR passage 163 that couples exhaust passage 145, downstream of exhaust catalyst 170 and upstream of exhaust throttle 164, with air intake passage 142, upstream of compressor 152. An EGR cooler 162 arranged in EGR passage 163 cools exhaust gas flowing there-through, as will be detailed below. A position of EGR valve 159, located in EGR passage 163 on the intake passage side of EGR cooler 162, may be adjusted by controller 120 to vary an amount and/or rate of exhaust gas recirculated from the exhaust passage to the intake passage via the LP-EGR system. In some embodiments, one or more sensors may be positioned within LP-EGR passage 163 to provide an indication of one or more of a pressure, temperature, and air-fuel ratio of exhaust gas recirculated through the LP-EGR passage. For example, temperature sensor 118 may be coupled to an outlet (on the intake passage side) of EGR cooler 162 and may be configured to provide an estimate of an EGR cooler outlet temperature. As elaborated below, during an engine cold-start, an opening of exhaust throttle 164 may be adjusted based on the EGR cooler outlet temperature to expedite heating of an engine temperature. Exhaust gas recirculated through LP-EGR passage 163 may be diluted with fresh intake air at a mixing point located at the junction of LP-EGR passage 163 and intake passage 142. Specifically, by adjusting a position of EGR valve 159, a dilution of the EGR flow may be adjusted.

As such, when EGR valve 159 is closed, at least a portion of exhaust gas may be directed through EGR cooler 162. As elaborated with reference to FIG. 2, by selectively increasing an amount of (hot) exhaust gas directed through EGR cooler 162, heat rejection at the EGR cooler may be increased. Since the EGR cooler is a heat exchanger configured to exchange with coolant that is fluidly coupled to an engine coolant system (not shown), the additional heat rejected at the EGR cooler may be used to heat engine coolant, thereby heating the engine. By using this heat rejection to increase an engine temperature during selected operating conditions, such as during an engine cold-start, exhaust catalyst activation can be expedited while also reducing engine NVH issues experienced during a cold-start. As such, this provides a more effective way of recovering latent heat from the water in the exhaust.

A bypass passage 165 may be included in vehicle system 106 to fluidly couple EGR passage 163 with exhaust passage 145. In particular, bypass passage 165 may couple EGR passage 163, on the intake passage side of EGR cooler 162, with exhaust passage 145, downstream of exhaust throttle 164 (substantially in tailpipe 135). Bypass passage 163 enables at least a portion of exhaust gas to be released to the atmosphere upon passage through EGR cooler 162. In particular, during conditions when EGR valve 159 is closed, exhaust gas (such as throttled exhaust gas generated upon closing of throttle 164) may be directed into EGR passage 163, then into EGR cooler 162, and then to tailpipe 135 via bypass passage 165. By venting some exhaust gas via bypass passage 165 when EGR valve 159 is closed, an exhaust pressure in EGR passage 163 (upstream of and at EGR cooler 162) can be maintained within limits. As such, this reduces damage to components of the LP-EGR system. In comparison, during conditions when EGR valve 159 is open, based on the degree of opening of EGR valve 159 and exhaust throttle 164, and further based on an amount of EGR requested and a ratio of intake to exhaust manifold pressure, exhaust gas may flow from upstream of throttle 164 to downstream of EBV 164, via EGR cooler 162 and bypass passage 165, or from downstream of throttle 164 to the intake passage side of EGR cooler 162 via intermediate passage 165.

In some embodiments (as depicted), an ejector 168 may be arranged in bypass passage 165. A motive flow of exhaust gas through ejector 168 may be harnessed to generate vacuum at a suction port of ejector 168. The suction port of ejector 168 may be coupled with, and stored in, vacuum reservoir 177. The stored vacuum can then be supplied to one or more vehicle system vacuum consumers, such as a brake booster, front end accessory drive (FEAD), positive crankcase ventilation system, vacuum-actuated valves, etc. A vacuum sensor 192 may be coupled to vacuum reservoir 177 to provide an estimate of available vacuum. In some examples, exhaust gas may flow from an inlet of ejector 168 (on the intake passage side of the ejector) to an outlet of ejector 268 (on the exhaust passage side of the ejector). In other examples, bi-directional flow through ejector 168 may be possible. In addition to vacuum from ejector 168, vacuum reservoir 177 may be coupled with one or more additional vacuum sources such as other ejectors arranged within vehicle system 106, electrically-driven vacuum pumps, engine-driven vacuum pumps, etc.

Depending on the position of exhaust throttle 164 and EGR valve 159, some or all of the exhaust gas exiting catalyst 170 may bypass the exhaust backpressure valve, enter the EGR passage and flow through bypass passage 165, providing a motive flow through ejector 168. For example, when throttle 164 is open and EGR valve 159 is closed, the throttle does not restrict exhaust flow through exhaust passage 145, and little or none of the exhaust flowing in exhaust passage 145 downstream of catalyst 170 bypasses the throttle via passage 165 (depending on the quantity of exhaust flow and relative diameters of passages 145 and 165). When the throttle is partially open and the EGR valve is closed, depending on the quantity of exhaust flow and relative diameters of passages 145 and 165, some exhaust may flow around the throttle while the remainder of the exhaust is diverted through ejector 168 via passage 165, bypassing the throttle. When the throttle is fully closed and the EGR valve is closed, all exhaust flow is directed into passage 165. When the EGR valve is open, based on the opening of the EGR valve, at least a portion of the exhaust gas exiting catalyst 170 may bypass the exhaust backpressure valve, enter the EGR passage, and be recirculated into intake passage 142. As elaborated with reference to FIG. 4, based on engine heating needs, vacuum needs, and EGR needs, a position of the exhaust throttle and the EGR valve may be adjusted to operating the engine system in one of multiple operating modes. In doing so, EGR and engine heating requirements may be met while also advantageously generating vacuum at exhaust ejector 168.

In some embodiments (as depicted), vehicle system 106 further includes a high-pressure EGR (HP-EGR) system 171. HP-EGR system 171 includes an EGR passage 173 that couples exhaust passage 145, upstream of turbine 154 with air intake passage 142, downstream of compressor 152 and upstream of charge air cooler 184 and intake throttle 182. An EGR cooler 172 arranged in EGR passage 173 cools exhaust gas flowing there-through. A position of EGR valve 179, located in EGR passage 173 on the intake passage side of EGR cooler 172, may be adjusted by controller 120 to vary an amount and/or rate of exhaust gas recirculated from the exhaust passage to the intake passage via the HP-EGR system. In some embodiments, one or more sensors may be positioned within HP-EGR passage 173 to provide an indication of one or more of a pressure, temperature, and air-fuel ratio of exhaust gas recirculated through the HP-EGR passage.

Engine 100 may be controlled at least partially by a control system 140 including controller 120 and by input from a vehicle operator via an input device (not shown). Control system 140 is configured to receive information from a plurality of sensors 160 (various examples of which are described herein) and sending control signals to a plurality of actuators 180. As one example, sensors 160 may include exhaust gas oxygen sensor 126 coupled to exhaust manifold 148, MAP sensor 121 coupled to intake manifold 144, exhaust catalyst temperature sensor 117, exhaust pressure sensor 119 located upstream of catalyst 170 in tailpipe 135, exhaust temperature sensor 128 and exhaust pressure sensor 129 located downstream of catalyst 170 in tailpipe 135, and vacuum sensor 192 arranged in vacuum reservoir 177. Various exhaust gas sensors may also be included in exhaust passage 145 downstream of catalyst 170, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the vehicle system 106. As another example, actuators 180 may include fuel injector 166, exhaust throttle 164, EGR valve 159, and intake throttle 182. Other actuators, such as a variety of additional valves and throttles, may be coupled to various locations in vehicle system 106. Controller 120 may receive input data from the various sensors, process the input data, and trigger the actuators in response to the processed input data based on instruction or code programmed therein corresponding to one or more routines. Example control routines are described herein with regard to FIGS. 2 and 4.

Figure 2:
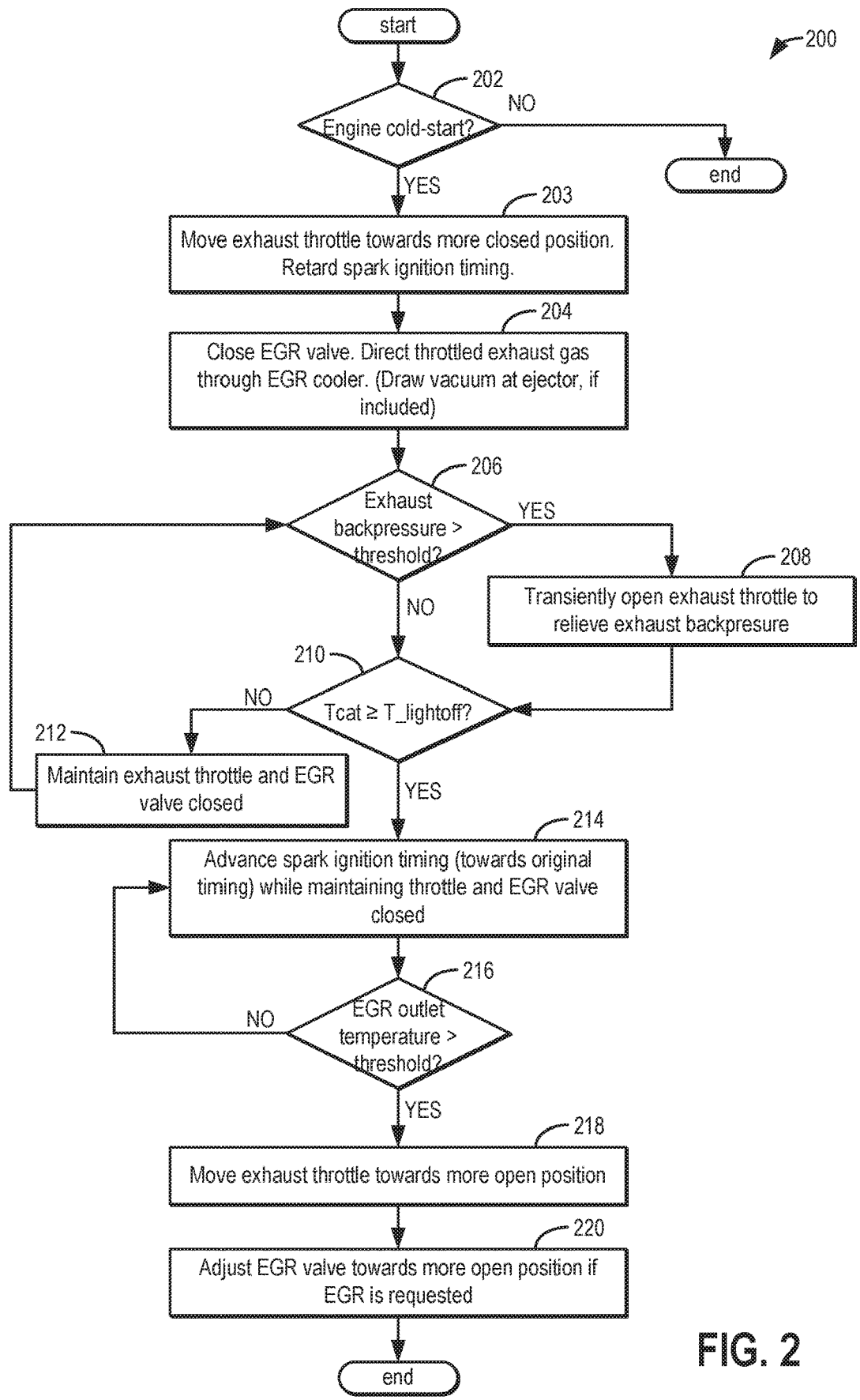
FIG. 2 shows a high level flow chart illustrating a routine that may be implemented for adjusting an exhaust backpressure valve and an EGR valve during an engine cold-start so as to expedite engine warm-up and catalyst activation.

Now turning to FIG. 2, routine 200 depicts a method for adjusting the position of an EGR valve (such as an EGR valve in a low-pressure EGR system) and an exhaust backpressure valve during an engine cold-start to expedite catalyst heating and activation while also addressing engine cold-start NVH issues.

At 202, the routine includes confirming an engine cold-start. For example, it may be determined if an engine temperature (e.g., as inferred from an engine coolant temperature) is below a threshold. In another example, it may be determined if a temperature at an exhaust catalyst is below a threshold temperature, such as below an activation or light-off temperature. If not, the routine may end.

Upon confirming an engine cold-start, at 203, the routine includes closing a post-catalyst exhaust backpressure valve (or exhaust throttle). In one example, closing the post-catalyst exhaust throttle includes fully closing the throttle. In another example, closing the post-catalyst exhaust throttle includes moving the exhaust throttle from the current position to a more closed position. By closing the exhaust throttle, an exhaust backpressure may be increased, thereby increasing an exhaust temperature, which assists in expediting exhaust catalyst heating. In addition, while the temperature of the exhaust catalyst is below the threshold temperature, and while the exhaust throttle is closed, the routine includes retarding ignition spark timing. By retarding spark timing, the exhaust temperature may be further increased, further assisting in expediting exhaust catalyst heating. An amount of spark retard applied may be adjusted based on the temperature of the exhaust catalyst. For example, as a difference between the exhaust catalyst temperature and the threshold temperature increases, more spark retard may be applied (as long as combustion stability is not degraded).

At 204, the routine includes closing an EGR valve. In one example, closing the EGR valve includes fully closing the EGR valve. In another example, closing the EGR valve includes moving the EGR valve from the current position to a more closed position. Herein, the EGR valve may be coupled in an LP-EGR system (such as LP-EGR system 161 of FIG. 1). By closing the EGR valve while also closing the exhaust throttle, at least a portion of the throttled exhaust gas is diverted through an EGR cooler of the LP-EGR system. In particular, a portion of the throttled exhaust gas is diverted through an EGR cooler located inside an EGR passage while maintaining an EGR valve in the EGR passage at a more closed position, wherein the EGR passage fluidly couples the engine exhaust from upstream of the exhaust throttle and downstream of the exhaust catalyst to an engine intake, upstream of an intake compressor. Herein, the EGR passage is a low pressure EGR passage. In other words, a larger portion of catalyst-treated exhaust gas is taken off from upstream of the throttle and diverted through an EGR cooler. Since the throttled exhaust gas has a higher temperature, passage of the hot exhaust gas through the EGR cooler causes a rise in heat rejection at the EGR cooler. Since the EGR cooler is coupled to the engine coolant system, the rejected heat is advantageously used to heat up the engine and the exhaust catalyst during the cold-start. Thus, the synergistic combination of exhaust gas throttling and increased heat rejection at the EGR cooler can be used to expedite exhaust catalyst activation faster than can be achieved with either method alone. Further, by using throttle and EGR valve adjustments concomitantly, the exhaust temperature can be increased while using a smaller amount of spark retard, thereby providing fuel economy benefits during the engine cold-start.

The diverting further includes routing the portion of throttled exhaust gas from an outlet of the EGR cooler to the engine exhaust, downstream of the exhaust throttle, via a bypass passage. The exhaust gas may then be vented to the atmosphere. In some embodiments, the bypass passage may include an ejector. In those embodiments, the portion of throttled exhaust routed through the bypass passage may be flowed through the ejector, enabling vacuum to be drawn at the ejector. In this way, the throttled exhaust flow through the EGR cooler can be used to expedite catalyst heating while additionally generating vacuum. The generated vacuum may then be used for the actuation of one or more engine vacuum actuators (e.g., a brake booster) that are coupled to the ejector.

At 206, while operating with the exhaust throttle and EGR valve closed, it may be determined if an exhaust backpressure is higher than a threshold pressure. In one example, the exhaust back-pressure may be estimated at a location upstream of the throttle and downstream of the catalyst (e.g., by a dedicated pressure sensor). In other examples, the exhaust backpressure may be inferred based at least on the temperature of the exhaust gas and a position (or degree of closing) of the exhaust throttle. As such, the closing of the exhaust throttle can lead to an increase in exhaust backpressure (and temperature) which is used to heat the catalyst. However, if the exhaust backpressure rises too far, engine component damage may occur (e.g., damage to the exhaust catalyst). Thus, at 208, while the temperature of the exhaust catalyst is below the threshold temperature, the routine includes intermittently (or transiently) opening the exhaust throttle in response to the exhaust back-pressure estimated upstream of the throttle (and downstream of the catalyst) being higher than a threshold pressure. Upon relieving the exhaust backpressure, the routine proceeds to 210 from 208. Else, if no exhaust backpressure build-up has occurred, the routine directly proceeds to 210 from 206.

As such, the closing of the valve and throttle and the diverting of exhaust gas through the EGR cooler is performed for a duration until a temperature of the exhaust catalyst is above a threshold temperature. For example, it may be continued until the exhaust catalyst has been sufficiently activated. Accordingly, at 210, it is determined if the exhaust temperature (or exhaust catalyst temperature) is at or above a threshold temperature, such as a catalyst light-off temperature (T_lightoff). If not, at 212, the exhaust throttle and the EGR valve may be maintained in the more closed position until the catalyst temperature is sufficiently high.

As such, even after the catalyst has been sufficiently heated, the engine may not be sufficiently heated, leading to NVH issues at the engine cold-start. Thus, even after the catalyst is activated, the throttle and the EGR valve may be maintained closed to continue rejecting heat at the EGR cooler to heat up the engine (via heating of engine coolant). Accordingly, after the temperature of the exhaust catalyst is above the threshold temperature, at 214, the routine includes maintaining the exhaust throttle closed and the EGR valve closed while advancing spark ignition timing (or reducing an amount of spark retard). Herein spark timing may be advanced to decrease exhaust heating via the spark timing adjustment. Advancing spark timing may include advancing the spark ignition timing from the retarded timing that was set at 203 towards an original timing that was set before 203. Alternatively, spark timing may be advanced (or spark retard may be reduced) to a timing based on the prevalent engine operating conditions.

Next, at 216, an EGR cooler outlet temperature may be estimated and it may be determined if the EGR outlet temperature is higher than a threshold temperature. The EGR cooler outlet temperature may be estimated, for example, by a temperature sensor coupled in the EGR passage, downstream of EGR cooler (such as sensor 118 of FIG. 1). In one example, the threshold temperature may correspond to a temperature at or above which the engine may be sufficiently warm and NVH issues may be reduced. As such, the throttle and EGR valve may be maintained closed until the EGR cooler outlet temperature is sufficiently warmed.

At 218, after the EGR outlet temperature has risen above the threshold temperature, the exhaust throttle may be opened (or moved to a more open position). In an alternate example, after the temperature of the exhaust catalyst is above the threshold temperature, the exhaust throttle may be adjusted based on the EGR cooler outlet temperature with the exhaust throttle shifted from a more closed position to a more open position as the outlet temperature of the EGR cooler increases.

At 220, after the EGR outlet temperature has risen above the threshold temperature, the EGR valve may also be opened (or moved to a more open position) if EGR is required. In particular, an opening of the EGR valve may be adjusted based on the engine's EGR (and engine dilution) requirement.

In this way, during an engine cold-start, an engine may be restarted with each of a post-catalyst exhaust throttle and an EGR valve closed. With the valves closed, at least a portion of throttled exhaust gas may be diverted around the exhaust throttle via an EGR cooler and an ejector. Each of the throttle and the valve may then be maintained closed until each of an exhaust temperature and an EGR cooler outlet temperature is above a threshold. This not only expedites exhaust catalyst activation but also reduced engine cold-start NVH issues. Thus, by using an increase in exhaust backpressure and increase in heat rejection at the EGR cooler, synergistic benefits are achieved in that each of an engine temperature and an exhaust catalyst temperature are raised to activation levels faster than would otherwise have been possible with either an increase in exhaust backpressure or an increase in heat rejection at the EGR cooler. In addition, the exhaust flow can be opportunistically harnessed for vacuum generation, the vacuum subsequently used for actuating various engine vacuum actuators. By opportunistically generating additional vacuum during the engine cold-start, while expediting engine heating and catalyst activation, the need for operating dedicated vacuum pumps for various vacuum actuators is reduced.

Figure 3:
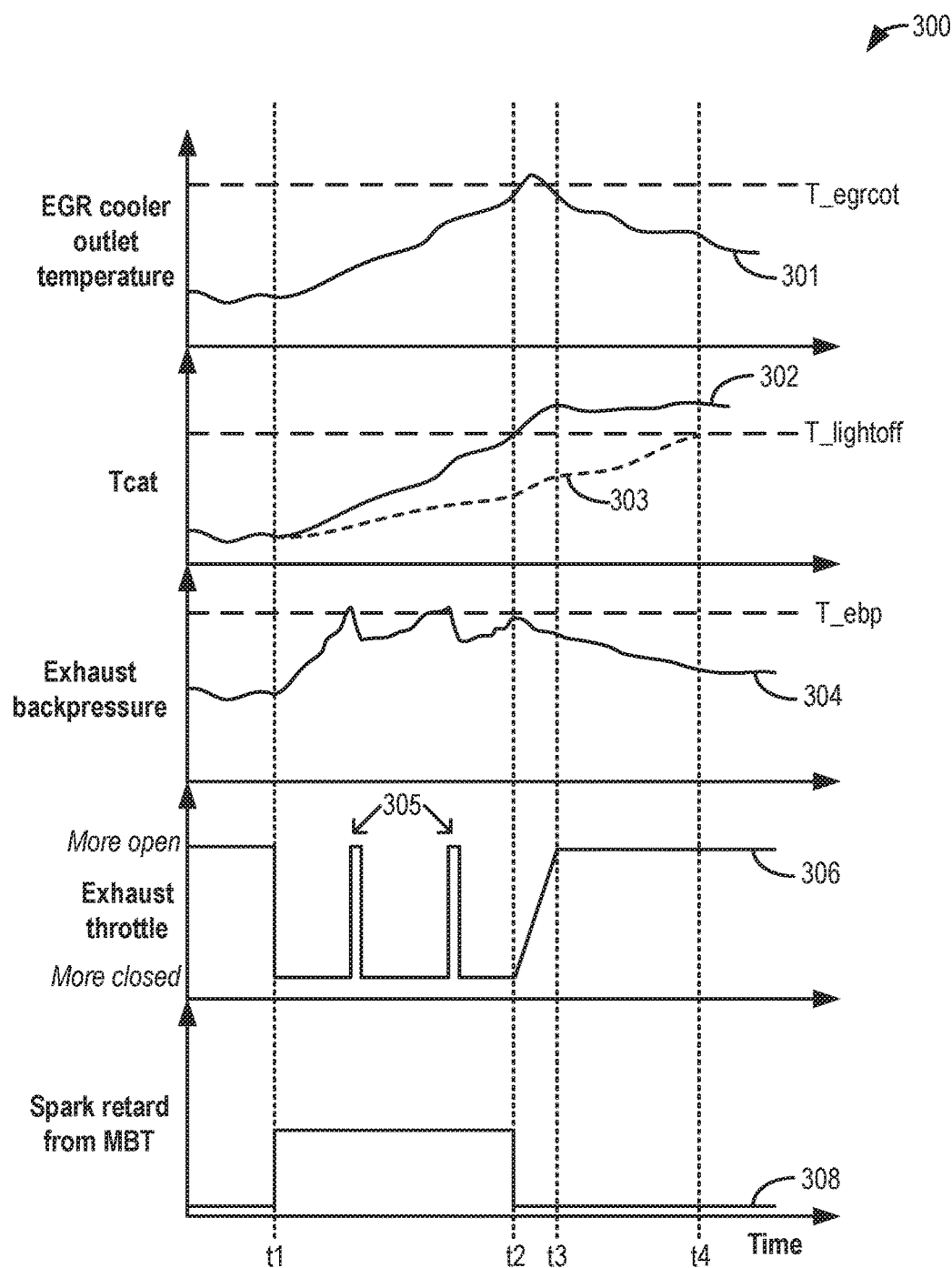
FIG. 3 shows an example exhaust backpressure valve and EGR valve adjustment for expediting engine warm-up, according to the present disclosure.

Coordination of exhaust backpressure valve and EGR valve adjustments to expedite catalyst activation while raising engine temperature is now shown with reference to the example of FIG. 3. Specifically, map 300 depicts an EGR cooler outlet temperature at graph 301, an exhaust catalyst temperature at graph 302, an exhaust backpressure at graph 304, exhaust throttle adjustments at graph 306, EGR valve adjustments at graph 308, and spark timing adjustments at graph 310. All graphs are plotted against time (along the x-axis).

At t1, an engine may be started. In particular, in response to the engine catalyst temperature (302) being below a threshold (T_light-off), an engine cold-start may be initiated at t1. During the engine cold-start, the engine is restarted with each of a post-catalyst exhaust throttle (306) and an EGR valve (308) closed. In the depicted example, the throttle and the EGR valve are fully closed, however it will be appreciated that in alternate examples, the throttle and the EGR valve may be moved to a more closed position. Closing the exhaust throttle causes an exhaust backpressure estimated upstream (e.g., immediately upstream) of the throttle to increase (304) as well as the catalyst temperature to increase (302).

With the exhaust throttle closed, at least a portion of throttled exhaust gas is diverted into an EGR passage (or EGR take-off) including the EGR valve and an EGR cooler positioned upstream of the EGR valve. In the depicted example, each of the EGR valve and the EGR cooler are positioned in a low pressure EGR passage, the EGR passage fluidly coupling an engine exhaust, from upstream of the exhaust throttle and downstream of the catalyst to an engine intake, upstream of an intake compressor. The increased flow of heated exhaust gas through the EGR cooler causes a rise in temperature at the EGR cooler (as shown by an increase in EGR cooler outlet temperature, 301). This in turn causes increased heat rejection at the EGR cooler, the heat rejected to the engine coolant. The heated coolant then leads to an increase in engine temperature which helps to reduce engine NVH issues at cold-start while also assisting in heating the exhaust catalyst. With the EGR valve also closed, the heated exhaust gas diverted through the EGR cooler is then flowed from the EGR cooler outlet into a bypass passage which connects back to the engine exhaust, downstream of the throttle. From there, the exhaust gas is vented to the atmosphere. As such, the combination of closing the exhaust throttle and the EGR valve (to increase exhaust backpressure and temperature and heat rejection at the EGR cooler) expedites catalyst heating. In particular, as depicted, the approach enables the catalyst temperature to reach the threshold (T_lightoff) in a smaller amount of time than would be possible without closing both valves (the claimed approach initiated at t1 enables the catalyst temperature to reach the threshold at t2, while in the absence of the claimed approach, catalyst temperature would reach the threshold at t4, as depicted by dotted graph 303).

In some embodiments, where the bypass passage includes an ejector, the exhaust gas is diverted around the exhaust throttle via the EGR cooler and the ejector. When the ejector is included, exhaust flow through the ejector may be harnessed enabling vacuum to be drawn at a neck of the ejector, the drawn vacuum then provided to one or more vacuum consumers of the engine (such as for operating a brake booster, for purging a canister, for crankcase ventilation, etc.)

During the restarting, while the EGR cooler outlet temperature and the catalyst temperature are below their respective thresholds, and while the exhaust throttle and the EGR valve are closed (between t1 and t2), spark ignition timing (310) may also be retarded (e.g., retarded from MBT). By using at least some spark retard, exhaust temperatures may be further increased, and catalyst activation may be further expedited.

At t2, the catalyst temperature may be above T-lightoff but the EGR cooler outlet temperature may still be below the desired threshold (T_egrcot). Thus, after t2, each of the throttle and the valve may be maintained closed until the EGR cooler outlet temperature is above the threshold. In addition, while the EGR cooler outlet temperature is increasing towards the threshold, spark ignition timing is advanced towards (or returned towards) MBT. That is, ignition timing may be returned to the original setting.

At t3, the EGR cooler outlet temperature reaches threshold T_egrcot. After t3, as the EGR cooler outlet temperature increases above the threshold, the exhaust throttle is moved to a more open position. This allows an exhaust backpressure and temperature to reduce. In addition a larger portion of the catalyst-treated exhaust gas is vented to the atmosphere through the exhaust throttle while only a smaller, remaining portion is vented to the atmosphere around the throttle, upon flowing through the EGR cooler and the bypass passage. Consequently, soon after t3, the EGR outlet temperature continues to increase for a short while, but then as the throttle is opened and the exhaust temperature drops, the EGR outlet temperature also starts to fall and stabilize at a lower value. It will be appreciated that while the depicted example shows the exhaust throttle being gradually moved to a more open position after t3, in alternate embodiments, the throttle may be fully opened at t3.

While the EGR cooler outlet temperature is below the threshold, the exhaust throttle may be intermittently opened in response to an exhaust backpressure upstream of the throttle being above a threshold pressure. For example, as shown at 305, in response to exhaust backpressure (304) rising above threshold T_ebp, the exhaust valve may be transiently opened to relieve the backpressure.

The EGR valve may be opened after the exhaust throttle has been opened to provide a desired amount of exhaust gas recirculation. As such, the EGR amount required may be determined based on engine operating conditions and engine dilution requirements. For example, if more engine dilution is required, the EGR valve may be moved to a more open position. In the depicted example, in response to an EGR request received at t4, the EGR valve is opened. However, it will be appreciated that in alternate embodiments, the EGR valve may be opened at the same time, or soon after the throttle is opened to provide EGR and engine dilution.

In some embodiments, the various throttle and EGR valve adjustments may be performed to operate an engine system in various modes. In one example, an engine system may comprise an engine including an intake and an exhaust, a turbocharger including an intake compressor and an exhaust turbine, an exhaust catalyst, and a post-catalyst exhaust throttle. The system may further include an EGR system including an EGR passage, an EGR cooler and an EGR valve, the system fluidly coupling the engine exhaust downstream of the catalyst and upstream of the throttle, to the engine intake, upstream of the compressor. A branch or bypass passage including an ejector may fluidly couple an outlet of the EGR cooler to the engine exhaust, downstream of the throttle. The engine system may further include a controller with computer readable instructions for operating the system in the various modes. For example, the engine system may be operated in a first mode with each of the throttle and the EGR valve closed and while flowing exhaust gas from the catalyst, through the EGR cooler and then through the ejector. As another example, the system may be operated in a second mode with each of the throttle and the EGR valve open and while flowing exhaust gas from the catalyst, through the ejector and then through the ejector. During both the first and second modes, vacuum may be drawn at the ejector. The controller may operate the system in the first mode during conditions when the exhaust catalyst is below a threshold temperature, while operating the system in the second mode during conditions when the exhaust catalyst is above the threshold temperature and an engine vacuum requirement is higher than a threshold. In some embodiments, while operating in the first mode, ignition spark timing may be retarded by a higher amount. In comparison, while operating in the second mode, ignition spark timing is retarded by a smaller amount.

Figure 4:
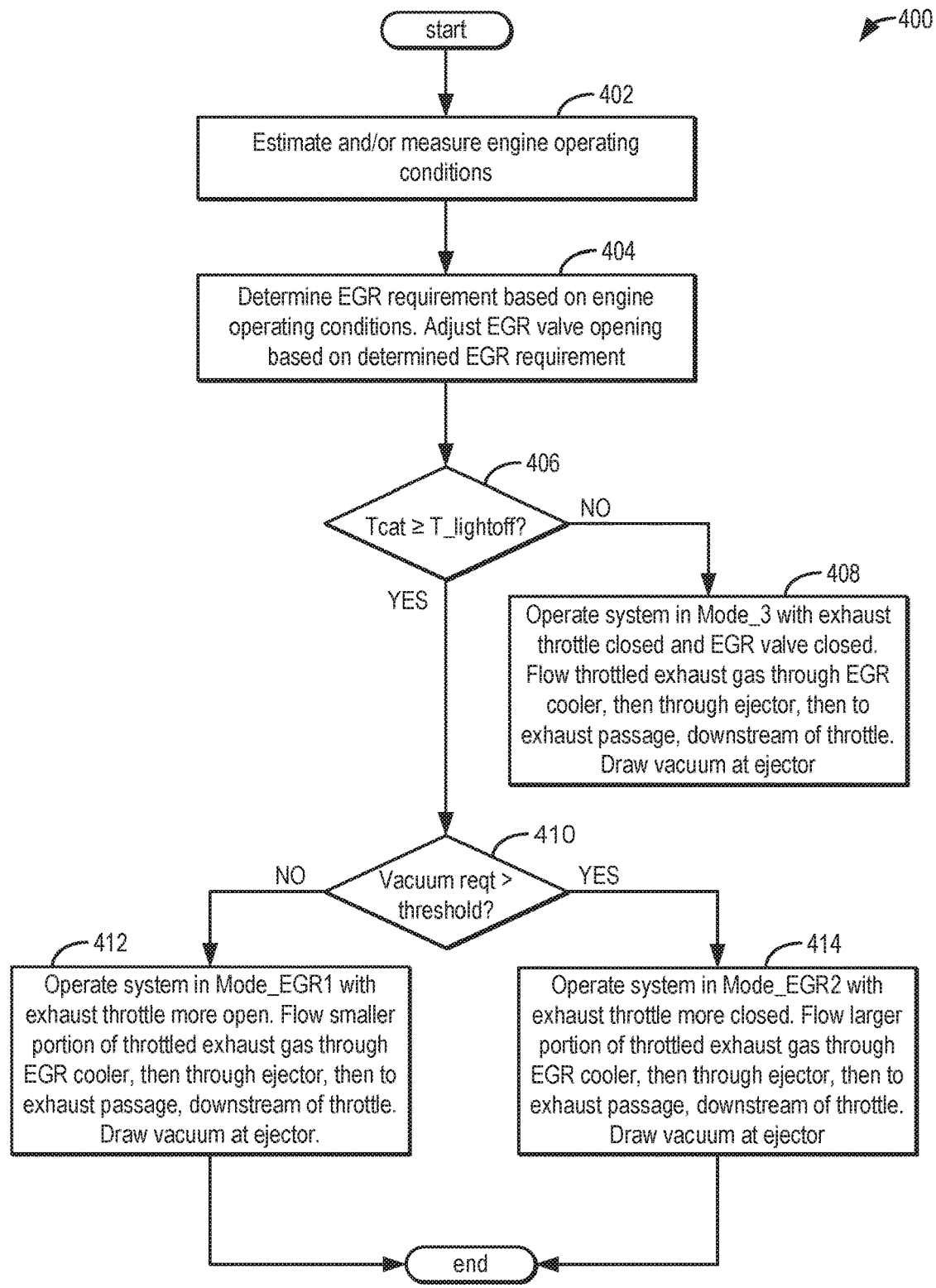
FIG. 4 shows a high level flow chart illustrating a routine that may be implemented for operating the engine system of FIG. 1 in various operating modes based on exhaust catalyst temperature, engine EGR needs, and engine vacuum needs.

Now turning to FIG. 4, an example routine 400 is shown for adjusting an EGR valve and an exhaust throttle in concert so to maintain an amount of EGR flow to an engine while meeting vacuum needs of various engine vacuum consumers.

At 402, the method includes estimating engine operating conditions. This may be include measuring and/or inferring conditions such as engine temperature, exhaust temperature and pressure, barometric pressure, engine speed, boost level, manifold pressure, manifold air flow, etc. At 404, based on the estimated operating conditions, an EGR requirement of the engine may be determined. For example, an amount of engine dilution or residuals required to improve engine performance and combustion stability may be determined. Based on the determined EGR requirement, an EGR valve position may be determined. In particular, an opening of the EGR valve may be determined based on the EGR requirement, the EGR valve opening increased (that is, the EGR valve shifted to a more open position) as the EGR requirement increases.

At 406, it may be determined if an exhaust catalyst temperature is higher than a threshold temperature, such as above a light-off temperature. In other words, it may be determined if any EGR valve and throttle adjustments are required to expedite catalyst heating. If the catalyst is sufficiently hot and activated, then at 410, the routine includes determining if an engine vacuum requirement is higher than a threshold. For example, it may be determined if there is a transient increase in vacuum requirement due to actuation of one or more engine system vacuum consumers/actuators. In an alternate example, it may be determined if manifold vacuum needs to be supplemented to enable actuation of the various engine system vacuum consumers.

At 412, if there is no (additional) vacuum requirement, the routine includes operating the engine system in a first EGR mode (Mode_EGR1) with the throttle more open to recirculate a portion of exhaust gas to the engine intake while directing a first, smaller amount of exhaust gas through the EGR cooler and then through the ejector. Herein, while recirculating the desired amount of exhaust gas to the engine intake, a smaller amount of catalyst-treated and throttled exhaust gas is vented to the atmosphere upon passing through the EGR cooler (where some heat is rejected), and then through the ejector, and then to the exhaust passage, downstream of the throttle. At least some vacuum is drawn at the ejector when operating in this first mode, the vacuum generated at the neck of the ejector due to flow of exhaust gas there-through. When operating in the first EGR mode with the throttle more open, the EGR valve may also be more open, with the opening of the EGR valve based on the portion of exhaust gas recirculated to the engine intake. That is, the EGR valve may be shifted to a more open position with the more open position selected to meet the engine's EGR requirement.

In comparison, at 414, if there is a vacuum requirement, the routine includes operating the engine system in a second EGR mode (Mode_EGR2) with the throttle more closed to recirculate the portion of exhaust gas to the engine intake while directing a second, larger amount of exhaust gas through the EGR cooler and then through the ejector. Herein, by closing the throttle, a larger amount of exhaust gas may be diverted into the EGR passage. The higher backpressure generated upstream of the throttle may cause EGR disturbances due to an increase in EGR flow due to the closing of the throttle. Thus, when operating in the second EGR mode, the EGR valve may be more closed, the closing of the EGR valve based on the closing of the throttle to maintain recirculation of the portion of exhaust gas to the engine intake. For example, as the throttle is moved to a more closed position, the EGR valve may also be moved to a more closed position to maintain the portion of EGR provided to the engine intake. Herein, while recirculating the desired amount of exhaust gas to the engine intake, a larger amount of catalyst-treated and throttled exhaust gas is vented to the atmosphere upon passing through the EGR cooler (where more heat is rejected), and then through the ejector, and then to the exhaust passage, downstream of the throttle. As in the first mode, at least some vacuum is drawn at the ejector when operating in the second mode, the vacuum generated at the neck of the ejector due to flow of exhaust gas there-through. However, a larger amount of vacuum is drawn at the ejector when operating in the second EGR mode as compared to the first EGR mode due to the larger flow of exhaust through the ejector in the second mode. In both the first and second EGR modes, the vacuum drawn at the ejector may be used by one or more engine vacuum actuators coupled to the ejector.

In some embodiments, the controller may monitor an exhaust temperature during the first or second modes. The controller may also monitor an exhaust backpressure estimated upstream of the exhaust throttle during the operating modes. In particular, when reducing an opening of the throttle valve during the second mode, there may be an increase in exhaust backpressure and exhaust temperature. Therein, in response to the exhaust temperature rising above a threshold temperature, the controller may increase the opening of each of the exhaust throttle and the EGR valve to being the exhaust temperature within a desired range. Likewise, in response to the exhaust backpressure rising above a threshold pressure, the opening of each of the exhaust throttle and the EGR valve may be increased to reduce the backpressure. In one example, adjustments performed during the first or second modes that are based on an increase in exhaust temperature and/or back-pressure may be transient changes. Therein, once the pressure and temperature are within the desired range, the original settings for the throttle and the EGR valve may be resumed.

It will be appreciated that while the depicted routine shows an engine controller selecting an operating mode of the engine system based on the vacuum requirement, in an alternate embodiment, the controller may be configured to transition the engine system from operating in the first mode to operating in the second mode in response to an increase in vacuum requirement by the one or more engine vacuum actuators. For example, the first mode may be a default EGR operating mode and the controller may shift the engine system to the second EGR operating mode to maintain EGR while also using the exhaust flow to generate vacuum for meeting the engine's vacuum need.

Returning to 406, if the catalyst is not sufficiently hot or activated, such as during an engine cold-start, then at 408, the routine includes operating the engine system in a third non-EGR mode (Mode_3) with each of the throttle and the EGR valve fully closed to direct a third amount of exhaust gas through the EGR cooler and then through the ejector. Herein, by closing the throttle, a larger amount of exhaust gas may be diverted into the EGR passage while the higher backpressure generated upstream of the throttle may be used to heat the exhaust and expedite catalyst activation. At the same time, by closing the EGR valve, the heated exhaust gas diverted into the EGR passage may be forced to flow through the EGR cooler and then through the ejector before being vented to the atmosphere. By flowing heated exhaust gas through the EGR cooler, more heat may be exchange by the EGR cooler with the engine coolant system, allowing an engine temperature to increase. This synergistically allows the engine exhaust to be heated and further expedites catalyst activation. Thus, the third amount of exhaust gas passed through the EGR cooler in the third mode may be higher than each of the first and second amounts, although the third amount may not be recirculated to the engine intake.

While the depicted routine shows an engine controller operating the engine system in the third mode in response to an engine temperature being lower than a threshold temperature, in further embodiments, the controller may transition the engine system from the third mode to the first mode in response to the exhaust temperature and/or the engine temperature being higher than the (respective) threshold temperatures. When transitioning from the third mode to the first mode, an opening of the throttle may be increased as EGR cooler outlet temperature increases, while an opening of the EGR valve may be increased as engine EGR requirement increases. In still further embodiments, the controller may transition the engine system from the third mode to the second mode in response to the exhaust temperature and/or the engine temperature being higher than the (respective) threshold temperatures and an increase in engine vacuum requirement.

In this way, an engine may be operated with exhaust gas recirculation, and in response to a vacuum requirement, each of an exhaust throttle and an EGR valve may be adjusted, in concert, to meet the vacuum requirement while maintaining the exhaust gas recirculation. As used herein, operating the engine with exhaust gas recirculation includes recirculating the amount of catalyst-treated exhaust gas from upstream of the exhaust throttle to an engine intake via an EGR passage, the EGR passage including the EGR cooler upstream of the EGR valve. By reducing an opening of each of a post-catalyst exhaust throttle and an EGR valve to increase exhaust flow through an EGR cooler and then through an exhaust ejector, vacuum can be drawn vacuum at the ejector to meet the vacuum need. By reducing the opening of the exhaust throttle based on the vacuum requirement while reducing the opening of the EGR valve based on the reduction in opening of the exhaust throttle, an amount of exhaust gas recirculation can be maintained. By maintaining the desired engine dilution, engine performance and combustion stability is not degraded while the vacuum need is also met.

Figure 5:
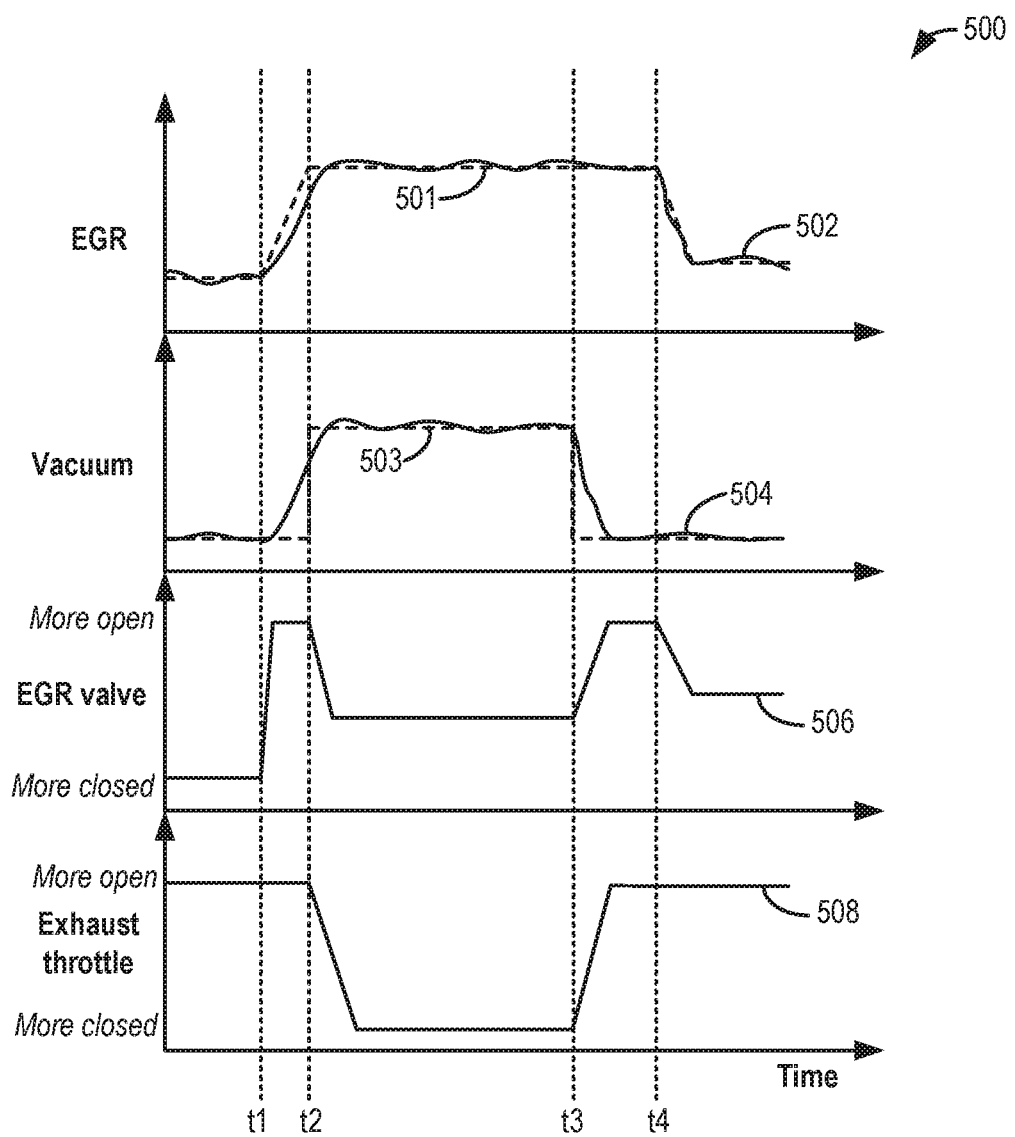
FIG. 5 shows an example exhaust backpressure valve and EGR valve adjustment for meeting engine vacuum and EGR needs, according to the present disclosure.

Coordination of exhaust backpressure valve and EGR valve adjustments to provide EGR while also meeting vacuum needs is now shown with reference to the example of FIG. 5. Specifically, map 500 depicts an EGR amount at plot 502, an ejector vacuum at plot 504, EGR valve adjustments at plot 506, and exhaust throttle adjustments at graph 508. All graphs are plotted against time (along the x-axis).

Prior to t1, the engine may be operating with no EGR requested. Accordingly, the engine may be operated with the EGR valve closed (506). The exhaust throttle may remain open to allow exhaust gas to be vented to the atmosphere through the throttle. At t1, an engine EGR requirement may increase (dotted line 501). In particular, an amount of EGR may be requested so as to provide engine dilution. To provide the desired engine dilution, the EGR valve may be (gradually) shifted to a more open position (506), where the more open position is based on engine operating conditions. By opening the EGR valve, a desired amount of exhaust gas can be recirculated to the engine intake (solid line 502). As elaborated with reference to FIG. 1, the EGR valve may be included in an EGR passage, or EGR take-off, coupling the engine exhaust, upstream of the throttle, to the engine intake. Further, the EGR passage may include an EGR cooler coupled downstream of a juncture of the EGR passage and the engine exhaust and upstream of the EGR valve. Thus, when recirculating, the desired amount of catalyst-treated exhaust gas may be diverted from upstream of the exhaust throttle into the EGR passage where it may flow through the EGR cooler and then through the (open) EGR valve before being recirculated into the engine intake, upstream of an intake compressor.

At t2, there may be an increase in engine vacuum requirement (dotted line 503). In one example, the increase in engine vacuum requirement may be due to the actuation of one or more vacuum consumers, such as vehicle brakes. In response to the increase in vacuum requirement, at t2, the post-catalyst exhaust throttle may be closed (or moved to a more closed position) so as to increase vacuum generation (solid line 504) at an exhaust ejector. As elaborated with reference to FIG. 1, the exhaust ejector may be located in a bypass passage coupling the EGR passage, downstream of the EGR cooler, to the engine exhaust, downstream of the throttle. Thus, by closing the post-catalyst throttle, a portion of the amount of exhaust gas may be flowed through the EGR cooler and then through the exhaust ejector. That is, catalyst-treated exhaust gas may be diverted from upstream of the exhaust throttle into the EGR passage from where a portion of it may flow through the EGR cooler and then through the ejector before being returned to the engine exhaust, downstream of the throttle, while the remaining portion flows through the EGR valve into the engine intake. Since the ejector is coupled to a vacuum actuator, the closing of the throttle may be performed in response to actuation of the vacuum actuator. Vacuum is then generated by the exhaust flowing through the ejector (504), and the generated vacuum can be drawn from a neck of the ejector and consumed by the various engine vacuum actuators.

Closing of the exhaust throttle, however, causes an increase in exhaust backpressure immediately upstream of the throttle. Since this is the location from where EGR is taken off, in the absence of any EGR valve adjustments, the increase in exhaust backpressure can lead to an increase in EGR recirculated to the engine intake. As such, these EGR fluctuations can degrade engine combustion stability and performance. Thus, also at t2, to maintain the amount of exhaust gas recirculation (at the desired level), the EGR valve may also be closed (or moved to a more closed position). In other words, the closing of the post-catalyst throttle is adjusted based on the engine vacuum need while the closing of the EGR valve is adjusted based on the closing of the throttle. As used herein, closing the EGR valve includes shifting the EGR valve from the more open position (at t2) to a more closed position, the more closed position based on the throttle closing. While the depicted example shows moving the throttle to a more closed position in response to the vacuum requirement, and moving the EGR valve to a more closed position in response to the throttle closing (to maintain EGR), in alternate examples, closing the throttle may include fully closing the throttle, while closing the EGR valve includes fully closing the EGR valve.

Between t2 and t3, the throttle and the EGR valve may be maintained at the more closed positions to continue generating vacuum (504) to meet the vacuum requirement (503) while also providing EGR (502) to meet the EGR requirement (501). At t3, in response to a drop in vacuum requirement, the exhaust throttle may be shifted back to a more open position. The drop in exhaust backpressure, consequently EGR flow, is compensated for by correspondingly and concomitantly opening the EGR valve, so that EGR is maintained after throttle opening at t3.

At t4, based on the prevalent engine operating conditions, the EGR requirement may reduce. In response to the drop in EGR requirement, at t4, the EGR valve may be adjusted to a more closed position so as to reduce the amount of exhaust gas diverted from upstream of the throttle to the engine intake. The EGR valve may then be maintained at an opening based on the desired engine dilution and other engine operating conditions.

In this way, exhaust throttle and EGR valve adjustments may be coordinated during various engine operating conditions to provide EGR, expedite heating, and provide vacuum, as needed. During an engine cold-start, an engine may be restarted with each of a post-catalyst exhaust throttle and an EGR valve closed. By diverting throttled exhaust gas through an EGR cooler, an increase in exhaust backpressure can be used to elevate exhaust temperatures, while increased heat transfer at the EGR cooler is synergistically used to further expedite catalyst activation as well as reduce engine cold-start NVH issues. By also directing the diverted throttle exhaust gas through an exhaust ejector, the exhaust flow can be opportunistically harnessed for vacuum generation. During non-cold-start conditions, exhaust throttling can be advantageously used to enhance vacuum production while providing EGR. By closing the throttle and diverting more exhaust gas through the ejector, vacuum needs can be met. While simultaneously closing an EGR valve, a desired engine dilution can be maintained. Overall, vacuum production can be provided without causing EGR fluctuations, and therefore without degrading engine performance.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

The invention claimed is:

1. A method for expediting activation of an exhaust catalyst coupled to an engine, comprising:
during a cold-start of the engine,
closing an exhaust throttle, disposed downstream of the exhaust catalyst, and an EGR valve while diverting at least a portion of throttled exhaust gas through an EGR cooler and then through a bypass passage joined to an EGR passage at a junction; and
opening and closing the exhaust throttle a plurality of times in response to an exhaust back-pressure estimated upstream of the throttle and downstream of the catalyst being higher than a threshold pressure while a temperature of the exhaust catalyst is below a threshold temperature.

2. The method of claim 1, wherein the diverting and the opening and closing are performed until the temperature of the exhaust catalyst is above the threshold temperature, and wherein the exhaust gas diverted through the bypass passage is not recirculated to an engine intake.

3. The method of claim 2, wherein the EGR valve is coupled to the EGR passage downstream of the junction, and wherein the EGR cooler is in thermal communication with a coolant system, the coolant system being in thermal communication with the engine.

4. The method of claim 2, wherein the diverting the portion of the throttled exhaust gas through the EGR cooler includes diverting the portion of the throttled exhaust gas through the EGR cooler located inside the EGR passage, the EGR passage fluidly coupling an engine exhaust from upstream of the exhaust throttle and downstream of the exhaust catalyst to an engine intake, upstream of an intake compressor.

5. The method of claim 4, wherein the EGR passage is a low pressure EGR passage.

6. The method of claim 4, wherein the bypass passage is coupled to the EGR passage downstream of an outlet of the EGR cooler and upstream of the EGR valve, and the bypass passage is coupled to the engine exhaust downstream of the exhaust throttle.

7. The method of claim 6, wherein the bypass passage includes an ejector and wherein routing the portion of throttled exhaust gas via the bypass passage includes flowing the portion of throttled exhaust gas through the ejector, the method further comprising drawing vacuum at the ejector.

8. The method of claim 2, further comprising, while the temperature of the exhaust catalyst is below the threshold temperature and while the exhaust throttle is closed, retarding spark ignition timing, an amount of spark retard adjusted based on the temperature of the exhaust catalyst.

9. The method of claim 8, further comprising, after the temperature of the exhaust catalyst is above the threshold temperature, maintaining the exhaust throttle closed while advancing spark ignition timing.

10. The method of claim 9, further comprising, after the temperature of the exhaust catalyst is above the threshold temperature, adjusting the exhaust throttle based on an EGR cooler outlet temperature.

11. The method of claim 10, wherein the adjusting includes, as the outlet temperature of the EGR cooler increases, shifting the exhaust throttle from a more closed position to a more open position.

12. A method for an engine system, comprising:
during a cold-start of the engine,
restarting the engine with each of a post-catalyst exhaust throttle and an EGR valve closed;
with the EGR valve and exhaust throttle closed, diverting at least a portion of throttled exhaust gas around the exhaust throttle via an EGR cooler and an ejector, and while diverting a portion of throttled exhaust gas via the ejector, drawing vacuum at a neck of the ejector, and providing the drawn vacuum to a vacuum consumer; and
maintaining each of the throttle and the EGR valve closed until an EGR cooler outlet temperature is above a threshold,
wherein the EGR cooler is in thermal communication with a coolant system, the coolant system in thermal communication with the engine.

13. The method of claim 12, further comprising the engine being a direct injection engine, and where the diverted portion of throttled exhaust gas is not recirculated to an engine intake.

14. The method of claim 13, further comprising opening the EGR valve after the EGR cooler outlet temperature is above the threshold, wherein each of the EGR valve and the EGR cooler are positioned in a low pressure EGR passage, the EGR passage fluidly coupling an engine exhaust, from upstream of the exhaust throttle and downstream of a catalyst to the engine intake, upstream of an intake compressor while the EGR valve is open, wherein the ejector is joined to the EGR passage downstream of the EGR cooler at a junction, and wherein the EGR valve is located in the EGR passage downstream of the junction.

15. The method of claim 12, further comprising, as the EGR cooler outlet temperature increases above the threshold, opening the exhaust throttle.

16. The method of claim 15, wherein during the restarting, while the EGR cooler outlet temperature is below the threshold and while the exhaust throttle is closed, retarding spark ignition timing from maximum brake torque (MBT), and as the EGR cooler outlet temperature increases above the threshold, advancing spark ignition timing towards MBT.

17. The method of 12, further comprising, while the EGR cooler outlet temperature is below the threshold, opening the exhaust throttle in response to an exhaust back-pressure upstream of the throttle being above a threshold pressure.

18. An engine system, comprising:
an engine including an intake and an exhaust;
a turbocharger including an intake compressor and an exhaust turbine;
an exhaust catalyst;
a post-catalyst exhaust throttle;
an EGR system including an EGR passage, an EGR cooler, and an EGR valve, the EGR system fluidly coupling the engine exhaust downstream of the catalyst and upstream of the throttle, to the engine intake, upstream of the compressor;
a branch passage including an ejector fluidly coupling an outlet of the EGR cooler to the engine exhaust, downstream of the throttle, where the EGR valve is located in the EGR passage downstream of a location where the branch passage couples to the EGR passage; and
a controller including a non-transitory computer-readable medium with instructions for:
operating the system in a first mode with each of the throttle and the EGR valve closed and while flowing exhaust gas from the catalyst, through the EGR cooler, where the exhaust gas is not recirculated to the engine intake;
operating the system in a second mode with each of the throttle and the EGR valve open and while flowing exhaust gas from the catalyst, through the EGR cooler, and then through the ejector; and
during both the first mode and the second mode, drawing vacuum with a neck of the ejector disposed in the branch passage, wherein the controller operates the system in the first mode during conditions when the exhaust catalyst is below a threshold temperature, and wherein the controller operates the system in the second mode during conditions when the exhaust catalyst is above the threshold temperature and an engine vacuum requirement is higher than a threshold.

19. The system of claim 18, wherein, while operating in the first mode, an ignition spark timing is retarded by a first amount and, while operating in the second mode, the ignition spark timing is retarded by a second amount, the first amount larger than the second amount.

* * * * *